Patented Oct. 24, 1933

1,931,795

UNITED STATES PATENT OFFICE 1,931,795

INSULATING MATERIAL AND PROCESS OF MANUFACTURE OF SAME

Russell H. Heilman, Pittsburgh, Pa., assignor to The Philip Carey Manufacturing Company, a corporation of Ohio No Drawing. Application April 23, 1929
Serial No. 357,609

7 Claims. (Cl. 106—21)

My invention relates to heat insulating material and process of manufacturing same. It is more especially for a heat insulating material to be used for insulating high temperature surfaces, where the temperatures run from 1500° F. to 1900° F. and above. By that I do not mean that the material is not in every way satisfactory for use on surfaces, the temperature of which is less than 1500° F., as my improved product can be used on surfaces of such lower temperatures.

My improved insulating material withstands temperatures of 1900° F. and above without appreciable shrinkage, without becoming soft and without disintegrating. From tests that I have made at approximately 1900° F., I have noted, that my product not only withstands the temperature without deterioration but that it tends to become harder.

In the manufacture of my insulating material, in order to obtain the greatest insulating efficiency, I use processed monohydrated bauxite while the particles of the material are in what I will term their initial condition before their bulky structure has been broken down by compression such as would occur in many of the commercial systems used for the moulding and drying of such materials. The breaking down of the physical structure or formation of the particles of the mass in such drying tends, as shown by microscopic examination, to compact the material so that when an insulation product is made by subsequent mixing in a liquid and moulding there will be a greater denseness of the final structure and consequently a greater volume of solid material and a less volume of dead air spaces. It is these dead air spaces upon which largely depends the insulating efficiency of the product. I produce the monohydrated bauxite by digesting ordinary aluminum trihydrate with a solvent such as a solution of sodium hydroxide, the proportions used being such that the amount of solvent is insufficient to dissolve more than a small portion of the aluminum trihydrate. When this mixture is heated at temperatures between about 250 and 400° F. under pressure there is produced a hydrated aluminum oxide which is in an extremely fine state of subdivision as a result of the abstraction of a portion of the combined water content of the aluminum trihydrate. The resulting material may contain some aluminum oxide in the trihydrate form, but it consists chiefly of aluminum oxide in the monohydrate form, and is in a very finely divided state of subdivision rendering it light in weight or of low density. By my process I use the monohydrated bauxite produced as stated in its initial moist condition and produce a heat insulating product in which the insulating efficiency is high due largely as is shown by microscopic examination to the fact that the particles of bauxite have not been broken down and the product is composed of a large quantity of dead air spaces and a relatively minimum quantity of solid material.

My improved insulating material is preferably composed primarily of monohydrated bauxite, asbestos fibre, bentonite clay, and an alkali such as hydrated lime or other suitable material. In the process of manufacture I take the monohydrated bauxite while in its initial moist condition as obtained from the processing of bauxite to form the monohydrated bauxite and before the monohydrated bauxite has been dried or formed into a powder or like dry material, and while in that moist condition I add if necessary additional liquid and the asbestos fibre, bentonite clay and hydrated lime. The batch is then thoroughly mixed and moulded whereby the surplus water or liquid is removed after which the material is dried.

While I have referred to the use of asbestos fibres, other suitable fibres such as mineral wool, or any fibres could be used that will impart to the finished product sufficient strength to permit of ordinary handling, without breakage, until after the product has been subjected to heat sufficient to set up a chemical reaction in the product which will strengthen it. If desired, the fibrous material could be dispensed with and the product baked at a temperature which would bond the product. Other clays than bentonite could be used such as any colloidal clay, or highly plastic clay.

In making my insulating material, the following process and materials and relative quantities of same have been found to give a satisfactory product. I take the desired quantity of monohydrated bauxite in moist form and if necessary to permit properly mixing with the other materials I add the necessary quantity of water or liquid. To this I add 5 to 10 per cent of asbestos fibres, 3 to 10 per cent of bentonite clay and if desired a small quantity of hydrated lime. I have found that one-half of 1 to 1 percent would be satisfactory. The hydrated lime may, if desired, be dispensed with although I prefer, in order to facilitate the manufacture of the product, to use same. The percentages given are based on the dry weight of the materials entering into the batch and while I have stated preferred percentages I do not want to be limited to the actual percentages stated, as a satisfactory product may be made with considerable variation in the percentages given. The materials having been added as stated, the batch, which is in a sufficiently liquid form to be thoroughly mixed, is agitated until the desired mixing has taken place, after which it is moulded in any suitable mould which will permit the liquid to pass out, and having been so moulded is then dried in any suitable way. After the material is dried if it is desired to give it some other form such for instance as the form of a pipe or a block of desired dimensions, it is milled in the ordinary way on a suitable machine. It may be desirable at times to use some aluminum powder or other like gas generating expander in the mix prior to moulding and if so a small percentage such as one-fifth of 1 per cent may be used. If desired the product could be baked after moulding. This baking would result in setting up a reaction which would bond the material and produce a relatively hard product.

I claim:

1. The process of manufacturing insulating material consisting in mixing with a mass of particles of monohydrated bauxite, resulting from the processing of natural bauxite to form said monohydrated bauxite, in its initial moist condition, asbestos fibre, and bentonite clay, agitating said mass to thoroughly disperse said asbestos fibre and said bentonite clay throughout the same removing the surplus liquid and drying the mass.

2. The process of manufacturing insulating material consisting in mixing with a mass of particles of monohydrated bauxite, resulting from the processing of natural bauxite to form said monohydrated bauxite, in its initial moist condition, asbestos fibre, bentonite clay, and hydrated lime, agitating said mass to thoroughly disperse said fibre, clay, and lime throughout the mass, removing the surplus liquid and drying the mass.

3. The process of manufacturing insulating material consisting in mixing with a mass of particles of monohydrated bauxite, resulting from the processing of natural bauxite to form said monohydrated bauxite, in its initial moist condition, asbestos fibre, bentonite clay, and a gas generating material, agitating said mass to thoroughly disperse said fibre, clay, and expanding material throughout the mass and forming gas cells therein, removing the surplus liquid and drying the mass.

4. The process of manufacturing insulating material consisting in mixing with a mass of particles of monohydrated bauxite, resulting from the processing of natural bauxite to form said monohydrated bauxite, in its initial moist condition, fibres of suitable material, a bonding material, agitating said mass to thoroughly disperse said fibres and said bonding material throughout the same, removing the surplus liquid and drying the mass.

5. The process of manufacturing insulating material consisting in mixing with a mass of particles of monohydrated bauxite, resulting from the processing of natural bauxite to form said monohydrated bauxite, in its initial moist condition, fibres of suitable material, a bonding material, agitating said mass to thoroughly disperse said fibres and said bonding material throughout the same moulding the mass and drying the mass.

6. The process of manufacturing insulating material consisting in mixing with a mass of particles of monohydrated bauxite, resulting from the processing of natural bauxite to form said monohydrated bauxite, in its initial moist condition, bonding material, agitating said mass to thoroughly disperse said bonding material throughout the same, removing the surplus liquid, drying the mass and baking same.

7. An insulating material containing light weight and low density mono-hydrated bauxite and fibers distributed in said bauxite, the mono-hydrated bauxite having the characteristics of light weight and low density resulting from using same in its initial moist condition, resulting from the processing of natural bauxite to form said mono-hydrated bauxite.

RUSSELL H. HEILMAN.